United States Patent Office 2,776,986
Patented Jan. 8, 1957

2,776,986

OXIDATION OF UNSYMMETRICAL STILBENES

Thomas F. Sanderson, Wilmington, Del., assignor to Hercules Powder Company, Wilmington, Del., a corporation of Delaware No Drawing. Application December 20, 1952,
Serial No. 327,152

9 Claims. (Cl. 260—479)

This invention relates to the oxidation of 3,5-disubstituted stilbenes and, more particularly, to the ozonization of dihydroxystilbene and its ethers and esters and cleavage of the intermediate ozonide that is formed.

It is well-known that the ethylene double bond of stilbene is very reactive and easily undergoes oxidation and other such reactions. However, unsymmetrically disubstituted stilbenes are unlike stilbene in that the ethylene double bond is extremely unreactive and no methods of selectively oxidizing such stilbenes were known.

Now, in accordance with this invention, it has been found that 3,5-dihydroxystilbene or its ethers or esters may be oxidized selectively at the double bond with ozone and the intermediate ozonide then cleaved to produce valuable oxidation products. Of particular importance is the preparation of 3,5-dihydroxybenzaldehyde and its ethers and esters by this means, outstandingly high yields being obtained when the ozonide-containing reaction mixture is cleaved, via steam distillation, immediately after formation of the ozonide. The corresponding 3,5-disubstituted benzoic acids may be obtained by this means when the intermediate ozonide is cleaved with alkaline hydrogen peroxide.

The following examples will illustrate the ozonization of 3,5-dihydroxystilbene and its ethers and esters in accordance with this invention and the oxidation products that may be obtained by cleavage of the ozonide-containing reaction mixture. All parts and percentages are by weight unless otherwise indicated.

*Example 1*

A solution of 72 parts of 3,5-dimethoxystilbene in a mixture of 1040 parts of methylene chloride and 320 parts of methanol was cooled to —60° C. Into the agitated solution was passed a mixture of ozone and oxygen containing 1.30 g. of ozone per cubic foot at a rate of about 3.6 cu. ft. per hour, the temperature being held at about —60° C. throughout the reaction. The reaction was stopped when about 14 parts of ozone had been absorbed by the reaction solution.

To the above ozonide-containing reaction mixture was added 500 parts of an aqueous 10% sodium hydroxide solution. The two-phase mixture was then agitated for 16 hours at room temperature. To the alkaline reaction mixture was then added 200 parts of a 30% hydrogen peroxide solution during a period of about 8 hours. Agitation of the reaction mixture was continued at room temperature for another 18 hours. At the end of this time, the aqueous alcohol layer was separated from the reaction mixture and its volume reduced to about 700 parts by evaporation at reduced pressure. It was then acidified with dry hydrogen chloride and cooled to about 0° C., whereupon a precipitate separated. The precipitate was collected by filtration and dried in a vacuum oven at 40° C. for 24 hours. The yield of mixed acids so obtained, i. e., the mixture of 3,5-dimethoxybenzoic acid and benzoic acid, amounted to 85 parts and ultraviolet spectral analysis indicated that there was present in the mixture 46 parts of 3,5-dimethoxybenzoic acid.

The methylene chloride layer from the ozonide decomposition reaction mixture was extracted with an aqueous 5% sodium hydroxide solution. On acidification, no acidic material was obtained. The methylene chloride solution was then washed several times with water, dried with sodium sulfate and evaporated, whereupon there was obtained 9.0 parts of a liquid which contained 7.5 parts of 3,5-dimethoxybenzaldehyde and 0.4 part of benzaldehyde. Thus, the overall yield from this alkaline hydrogen peroxide cleavage amounted to an 82% yield of 3,5-dimethoxybenzoic acid and a 15% yield of 3,5-dimethoxybenzaldehyde.

*Example 2*

A solution of 72 parts of 3,5-dimethoxystilbene in 780 parts of methylene chloride and 320 parts of methanol was cooled to —60° C. and treated with ozone as described in Example 1 until 13 parts of ozone had been absorbed. Immediately following the addition of the ozone, the reaction mixture was subjected to steam distillation. Four cuts of the steam distillate were made. During distillation of the fourth cut, a crystalline solid, which was later shown to be 3,5-dimethoxybenzaldehyde, formed in the condenser and the aqueous distillate. Each of these cuts was extracted with ether and the ether extracts then dried with anhydrous sodium sulfate and evaporated. The first cut was found to consist chiefly (75%) of benzaldehyde and the remaining 3 cuts were chiefly (60-78%) 3,5-dimethoxybenzaldehyde. The 4 cuts were combined and then distilled, whereby there was obtained 24.85 parts of benzaldehyde having a boiling point of 48°–53° C. at 2 mm. and 41.40 parts of 3,5-dimethoxybenzaldehyde having a boiling point of 120°–125° C. at 2 mm. On standing, the 3,5-dimethoxybenzaldehyde solidified to a crystalline product having a melting point of 44°–46° C. Recrystallization from hexane raised the melting point of this material to 46°–47° C. A mixed melting point with an authentic sample of 3,5-dimethoxybenzaldehyde exhibited no depression.

*Example 3*

A solution of 20 parts of 3,5-dimethoxystilbene in 650 parts of methylene chloride and 120 parts of methanol was cooled to —60° C. and treated with ozone as described in Example 1 until 11 parts of ozone had been absorbed. The ozonization reaction mixture was then transferred to a stainless steel hydrogenation bomb where in the presence of 3 parts of a 5% palladium-on-carbon catalyst it was shaken with hydrogen at 60-70 p. s. i. and 40° C. for 1 hour. At the end of this time, the reaction mixture was filtered to remove the catalyst and the methylene chloride—methanol solvent was removed. The residue was dissolved in 350 parts of ether and the etheral solution was extracted several times with 150-part portions of a 5% aqueous sodium hydroxide solution. The alkali extracts were combined, acidified with hydrochloric acid, whereupon a crystalline material precipitated. The precipitate was collected and dried. It amounted to 1.91 parts and was shown by ultraviolet spectral analysis to contain 40% of 3,5-dimethoxybenzoic acid. The ether solution which remained from the above extract was dried and evaporated, whereby there was obtained the alkali-insoluble material. It was an amber liquid which by ultraviolet spectral analysis contained 46% of 3,5-dimethoxybenzaldehyde.

*Example 4*

A solution of 99.3 parts of 3,5-diacetoxystilbene in a mixture of 1200 parts of methylene chloride and 400 parts of methanol was cooled to −80° C. to −70° C. and treated with ozone as described in Example 1. A sharp break in absorption of ozone occurred between 15 and 16 parts (theory for ozone 15.8 parts) and the ozonization was stopped. The ozonide was decomposed by immediately steam-distilling the reaction mixture, the benzaldehyde distilling out of the reaction mixture with the steam. The residue that remained after the steam distillation was dissolved in ether and the ethereal solution was distilled. The fraction boiling at 198°–205° C. (15 mm.) amounted to 61 parts (83% of the theoretical yield). It was shown to be 3,5-diacetoxybenzaldehyde by preparing the thiosemicarbazone, the latter having a melting point of 196°–197° C.

Example 5

A solution of 12.1 parts of 3,5-dihydroxystilbene in a mixture of 270 parts of methylene chloride and 80 parts of methanol was cooled to −80° C. to −70° C. and treated with ozone as in the foregoing examples. When the ozone ceased to be absorbed, the ozonization was stopped and the reaction mixture was treated with steam to decompose the ozonide and steam-distill the aldehydes. The 7.5 parts of product so obtained was dissolved in alcohol and treated with 5 parts of thiosemicarbazide, whereby there was obtained 6 parts of the thiosemicarbazone of 3,5-dihydroxybenzaldehyde having a melting point of 232°–233° C.

As may be seen from the foregoing examples, when 3,5-dihydroxystilbene, or an ether or ester thereof, is oxidized with ozone, the oxidation takes place selectively at the ethylene double bond and the ozonide so produced may then be cleaved to produce valuable oxidation products. Any unsymmetrical stilbene having the formula

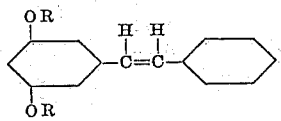

where R is hydrogen, alkyl or acyl, and where both R's may be alike or different, may be oxidized in accordance with this invention. Exemplary of such stilbenes are 3,5-dihydroxystilbene, 3-hydroxy-5-methoxystilbene, 3-hydroxy-5-ethoxystilbene, 3,5-dimethoxystilbene, 3,5-diethoxystilbene, 3,5-dipropoxystilbene, 3,5-dibutoxystilbene, 3,5-diisobutoxystilbene, 3,5-diamyloxystilbene, 3,5-diacetoxystilbene, 3,5-dipropionoxystilbene, 3,5-dibenzoxystilbene, etc.

The ozonization reaction in accordance with this invention is carried out by passing ozone into a solution of the 3,5-disubstituted stilbene in an inert solvent. Any organic liquid that is solvent for the 3,5-disubstituted stilbene and which it itself not appreciably affected by ozone under the conditions of the reaction may be used. Exemplary of suitable solvents for the process are methanol, ethanol, acetic acid, methylene chloride, ethyl chloride, chloroform, carbon tetrachloride, etc., and mixtures of these solvents. The temperature at which the ozonization reaction is carried out may be varied from about −100° C. to about +10° C. but preferably will be within the range of from about −80° C. to about −50° C.

The intermediate ozonide believed to be formed by the ozonization of these 3,5-disubstituted stilbenes is then cleaved to produce the oxidation products, the type of oxidation product obtained being determined by the type of cleavage applied to the ozonization reaction mixture. For example, cleavage with water or by catalytic hydrogenation of the ozonization reaction mixture obtained by ozonization of 3,5-dimethoxystilbene yields a mixture of 3,5-dimethoxybenzaldehyde and benzaldehyde, and cleavage by alkaline hydrogen peroxide yields a mixture of benzoic and 3,5-dimethoxybenzoic acids.

Most surprisingly, it has been discovered that when the reaction mixture containing the ozonide is steam-distilled immediately after the ozonization reaction, almost theoretical yields of benzaldehyde and the 3,5-disubstituted benzaldehyde are obtained, whereas only about one-half of this amount is obtained if the steam distillation is not carried out immediately upon completion of the ozonization reaction. This steam distillation may be carried out by passing steam into the reaction mixture at atmospheric pressure or at superatmospheric pressure, as, for example, at 50 to 200 p. s. i. Another advantage of steam distillation for cleaving the intermediate ozonide is that the two aldehydes may be separated in the process into two separate fractions. Thus, this process not only proceeds with nearly theoretical yields but the oxidation products are obtained in nearly pure form.

Cleavage of the ozonide-containing reaction mixture to the mixed aldehydes may also be carried out by catalytic hydrogenation. The mixed aldehydes so obtained may be separated into pure benzaldehyde and the 3,5-disubstituted benzaldehyde, or they may be further reduced by catalytic hydrogenation to the corresponding benzyl alcohols and used as such or separated into pure benzyl alcohol and the 3,5-disubstituted benzyl alcohol.

The catalytic hydrogenation of the ozonization reaction mixture may be carried out using palladium or any noble metal catalyst at a temperature of from about 0° C. to about 40° C. and preferably at about 25° C. at a pressure of from about 10 to about 1000 p. s. i. and preferably about 50 p. s. i.

The cleavage reaction may also be carried out with alkaline hydrogen peroxide, whereby the oxidation product will be a mixture of benzoic acid and the 3,5-disubstituted benzoic acid. These mixed acids may be used as such or separated. The hydrogen peroxide cleavage may be carried out in the presence of any alkali metal hydroxide, as, for example, potassium hydroxide, sodium hydroxide, etc. The hydrogen peroxide is most easily added in the form of an aqueous solution thereof. The amount of hydrogen peroxide added will, for optimum yields, be at least the theoretical amount required to cleave the ozonide to the acids and preferably a large excess will be added. The cleavage may be carried out at a temperature of from about 0° C. to about 20° C., and preferably is carried out at a temperature of from about 20° C. to about 70° C.

The process of this invention is important in the preparation of 3,5-disubstituted benzaldehydes and particularly in the production of 3,5-dialkoxybenzaldehydes which are used as intermediates in the preparation of a valuable class of virucides, the 3,5-dialkoxybenzaldehyde thiosemicarbazones. According to this invention, these aldehydes may now be prepared from dimethoxystilbene, a commercially available by-product of little prior utility. The 3,5-dimethoxybenzaldehyde is obtained from the dimethoxystilbene by ozonization and cleavage as shown in the foregoing examples. The other 3,5-dialkoxybenzaldehydes may be prepared from dimethoxystilbene by hydrolysis of the methyl ether groups followed by etherification of the 3,5-dihydroxystilbene with the desired alkyl group and then ozonization and cleavage in accordance with this invention.

What I claim and desire to protect by Letters Patent is:

1. The process of oxidizing a disubstituted stilbene having the formula

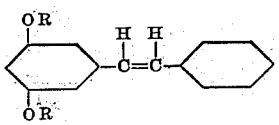

where each R is one of the group consisting of hydrogen, lower alkyl radicals and the acyl radicals of lower alkanoic and aryl carboxylic acids, which comprises passing ozone into a solution of said stilbene in an inert solvent at a temperature of from about −100° C. to about +10° C. and cleaving the ozonide so formed.

2. The process of oxidizing a disubstituted stilbene having the formula

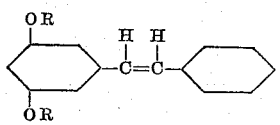

where each R is one of the group consisting of hydrogen, lower alkyl radicals and the acyl radicals of lower alkanoic and aryl carboxylic acids, which comprises passing ozone into a solution of said stilbene in an inert solvent at a temperature of from about −100° C. to about +10° C. and cleaving the ozonide so formed by steam distillation of the reaction mixture.

3. The process of oxidizing a disubstituted stilbene having the formula

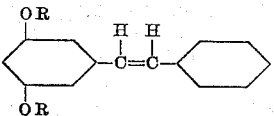

where each R is one of the group consisting of hydrogen, lower alkyl radicals and the acyl radicals of lower alkanoic and aryl carboxylic acids, which comprises passing ozone into a solution of said stilbene in an inert solvent at a temperature of from about −100° C. to about +10° C. and cleaving the ozonide so formed by the addition of an aqueous solution of an alkali metal hydroxide and hydrogen peroxide.

4. The process of oxidizing 3,5-dihydroxystilbene which comprises passing ozone into a solution of 3,5-dihydroxystilbene in an inert solvent at a temperature of from about −100° C. to about +10° C. and cleaving the ozonide so formed by steam distillation of the reaction mixture.

5. The process of oxidizing 3,5-dialkoxystilbene which comprises passing ozone into a solution of 3,5-dialkoxystilbene in an inert solvent at a temperature of from about −100° C. to about +10° C. and cleaving the ozonide so formed by steam distillation of the reaction mixture, where said alkoxy groups are those of lower alkyl radicals.

6. The process of oxidizing 3,5-diacyloxystilbene which comprises passing ozone into a solution of 3,5-diacyloxystilbene in an inert solvent at a temperature of from about −100° C. to about +10° C. and cleaving the ozonide so formed by steam distillation of the reaction mixture, where said acyl groups are those of lower alkanoic acids.

7. The process of oxidizing 3,5-dimethoxystilbene which comprises passing ozone into a solution of 3,5-dimethoxystilbene in an inert solvent at a temperature of from about −100° C. to about +10° C. and cleaving the ozonide so formed by steam distillation of the reaction mixture.

8. The process of oxidizing 3,5-diacetoxystilbene which comprises passing ozone into a solution of 3,5-diacetoxystilbene in an inert solvent at a temperature of from about −100° C. to about +10° C. and cleaving the ozonide so formed by steam distillation of the reaction mixture.

9. The process of oxidizing 3,5-dimethoxystilbene which comprises passing ozone into a solution of 3,5-dimethoxystilbene in an inert solvent at a temperature of from about −100° C. to about +10° C. and cleaving the ozonide so formed by the addition of an aqueous solution of an alkali metal hydroxide and hydrogen peroxide.

References Cited in the file of this patent

Chemical Abstracts, vol. 33, col. 8988[9] and 8989[1] (1939), Erdtman, H., Extracts from the heartwood of fir.

Chemical Abstracts, vol. 44, col. 559[1] (1950), Briner, E. and Aguadisch, L., Oxidation of stilbene.